(12) United States Patent
Addison et al.

(10) Patent No.: US 7,621,446 B2
(45) Date of Patent: Nov. 24, 2009

(54) CONVERTIBLE SELF-CHECKOUT SYSTEM

(75) Inventors: Danny H. Addison, Durham, NC (US);
Richard H. Harris, Raleigh, NC (US);
Robert A. Myers, Cary, NC (US);
Thomas J. Sluchak, Apex, NC (US);
Robert P. Tennant, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 11/401,675

(22) Filed: Apr. 11, 2006

(65) Prior Publication Data
US 2007/0235531 A1    Oct. 11, 2007

(51) Int. Cl.
*G06K 15/00* (2006.01)
(52) U.S. Cl. .......................... 235/383; 705/16; 361/683
(58) Field of Classification Search ................ 235/383; 705/16, 5; 361/683; 186/61–69
See application file for complete search history.

(56) References Cited

U.S. PATENT DOCUMENTS

| | | | |
|---|---|---|---|
| 5,884,728 A * | 3/1999 | d'Estaintot et al. ............ | 186/62 |
| 6,213,395 B1 | 4/2001 | Dejaeger et al. | |
| 6,286,758 B1 * | 9/2001 | Dejaeger et al. ............ | 235/383 |
| 6,390,363 B1 | 5/2002 | Morrison et al. | |
| 6,394,345 B1 | 5/2002 | Dejaeger et al. | |
| 6,588,549 B2 | 7/2003 | Wike, Jr. et al. | |
| 2002/0145037 A1 * | 10/2002 | Goodwin, III .............. | 235/383 |
| 2003/0115103 A1 | 6/2003 | Mason | |
| 2004/0069848 A1 | 4/2004 | Persky | |
| 2005/0051978 A1 * | 3/2005 | Sabol ...................... | 280/14.24 |
| 2006/0000909 A1 * | 1/2006 | Knowles et al. ............. | 235/454 |
| 2006/0198094 A1 * | 9/2006 | Kano et al. ................. | 361/683 |

* cited by examiner

*Primary Examiner*—Allyson N Trail
(74) *Attorney, Agent, or Firm*—Jason O. Piche, Esq.; Steven M. Greenberg, Esq.; Carey, Rodriguez, Greenberg & Paul, LLP

(57) ABSTRACT

A convertible self-checkout system includes a base and a stand rotatably mounted to the base. The stand includes an input/output device facing in a first direction and a product scanner, and the stand is positionable relative to the base in at least a first angular position and a second angular position. The input/output device is an interactive video display, and the interactive video display has a first mode corresponding to the first angular position and a second mode corresponding to the second angular position. A sensor determines an angular position of the stand relative to the base and communicates the angular position to the interactive video display. The stand further includes a video display facing in a second direction substantially opposite from the first direction.

18 Claims, 4 Drawing Sheets

CONVERTIBLE SELF-CHECKOUT SYSTEM

BACKGROUND OF THE INVENTION

1. Field of the Invention

The disclosure relates generally to checkout systems and, more specifically, to a checkout system that is convertible from a self-checkout system to staffed checkout system.

2. Description of the Related Art

Many register checkout stations, which have been a standard feature in grocery stores, home improvement stores, and other retailers, have been replaced by self-checkout stations. These self-checkout stations reduce expenses for the retailers while offering convenience and time savings to customers. Certain retailers, however, require that the self-checkout stations be converted into a staffed checkout station to increase throughput, for example, during peak hours.

This issue is currently being addressed by at least two different system. In both of these systems, the main video display is positioned on a pivoting mount. These systems, however, differ in how access to the barcode scanner by the shopper or cashier is changed. In one of the systems, the barcode scanner is mounted on a separate rolling cart, and to transition the checkout station from self-checkout to staffed checkout, the rolling cart is pulled out of its initial location, rotated 180°, and placed back into its initial location. In contrast, the other system uses duplicate scanners. One of the two scanners is a conventional, scanner/scale for use by the shopper on the shopper-side of the checkout station, and the other scanner is a small, hand-held scanner on the cashier-side of the checkout station.

The above described convertible checkout systems, however, each have issues associated with them. For example, the switchover of the first checkout system from self-checkout to staffed checkout involves a considerable amount effort to accomplish. With regard to the second checkout system, providing duplicate scanners raises the costs of the checkout system. There is, therefore, a need for a convertible self-checkout station that can be cost-effectively and quickly converted from self-checkout to staffed checkout and vice versa.

BRIEF SUMMARY OF THE INVENTION

Embodiments of the invention address deficiencies of the art in respect to self-checkout systems and provide a novel and non-obvious apparatus for converting a checkout system from self-checkout to staffed checkout. In this regard, the self-checkout system includes a base and a stand rotatably mounted to the base. The stand includes an input/output device facing in a first direction and a product scanner, and the stand is positionable relative to the base in at least a first angular position and a second angular position. The input/output device is an interactive video display, and the interactive video display has a first mode corresponding to the first angular position and a second mode corresponding to the second angular position. A sensor determines an angular position of the stand relative to the base and communicates the angular position to the interactive video display. The stand further includes a video display facing in a second direction substantially opposite from the first direction.

In certain aspects, the self-checkout system also includes a payment reader attached to the stand. The scanner is a barcode reader or a radio frequency identification reader. Also, the self-checkout system may include a turntable to which the base and stand are attached. A first stop is provided to prevent the stand from rotating relative to the base substantially past the first angular position, and a second stop is provided for preventing the stand from rotating relative to the base substantially past the second angular position. A first latch optionally prevents rotation of the stand relative to the base upon the stand being in the first angular position, and a second latch optionally prevents rotation of the stand relative to the base upon the stand being in the second angular position.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1A:
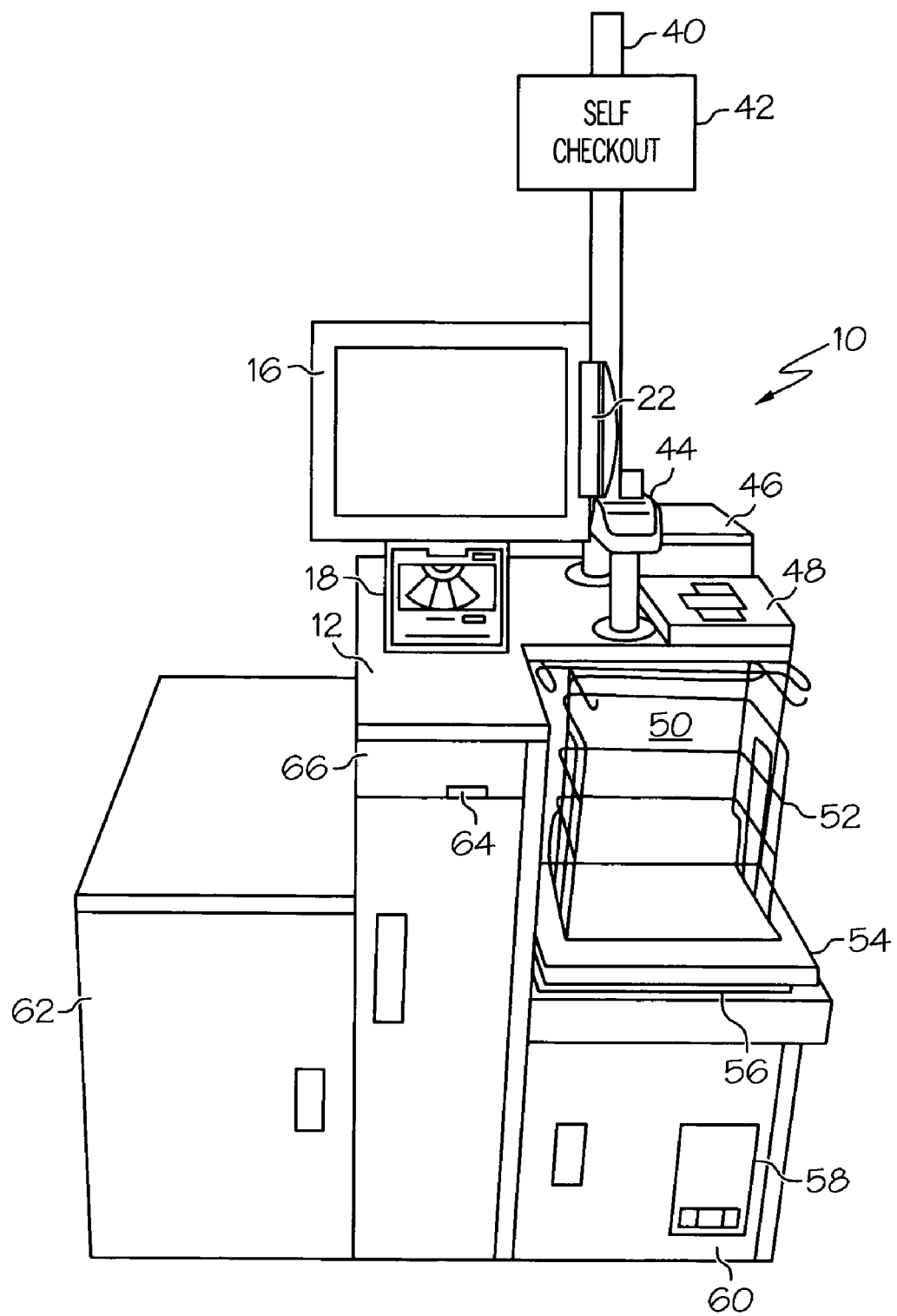
FIGS. 1A and 1B are respectively front and rear perspective views of a convertible self-checkout system in accordance with the inventive arrangements.
Figure 1B:
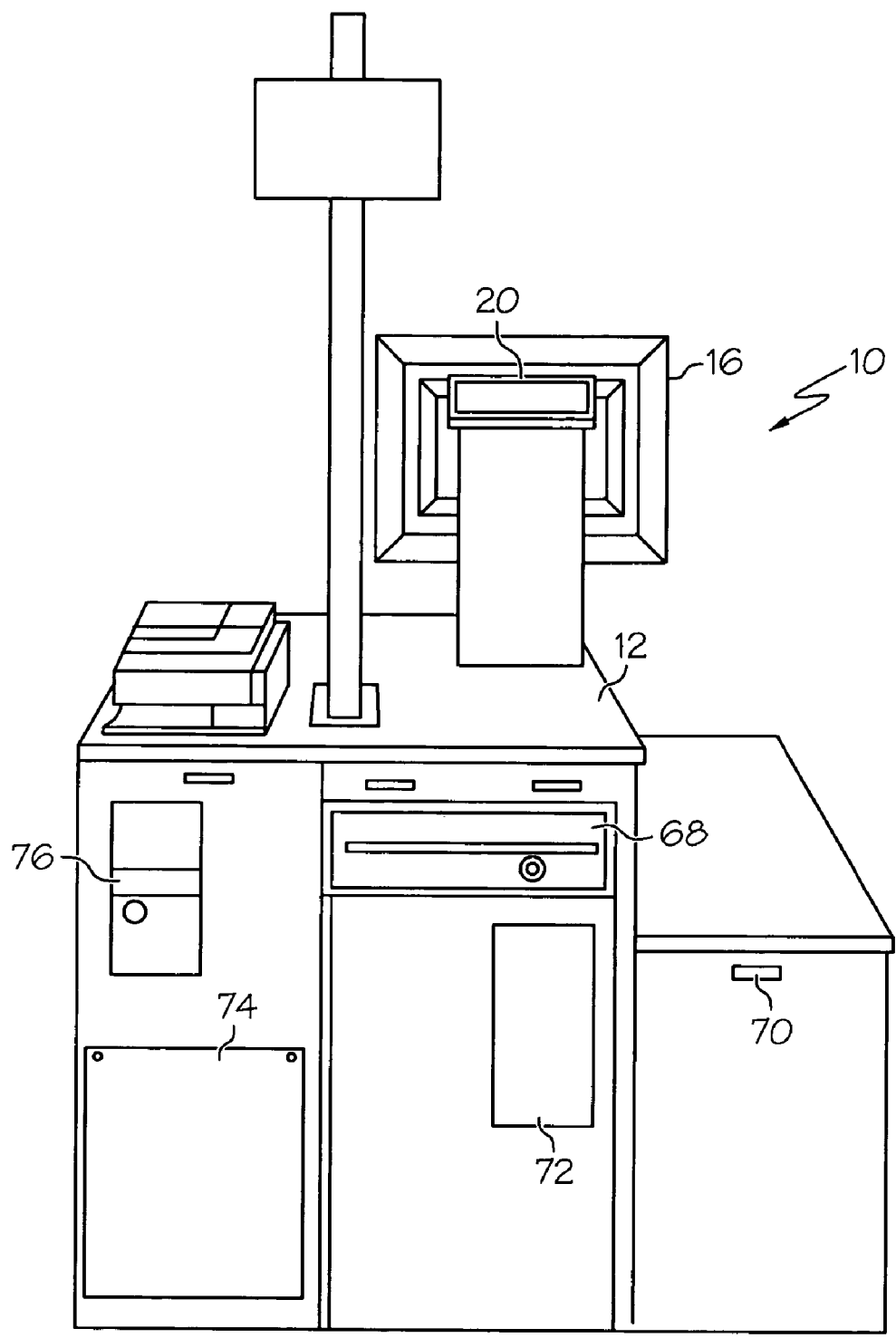
Figure 2A:
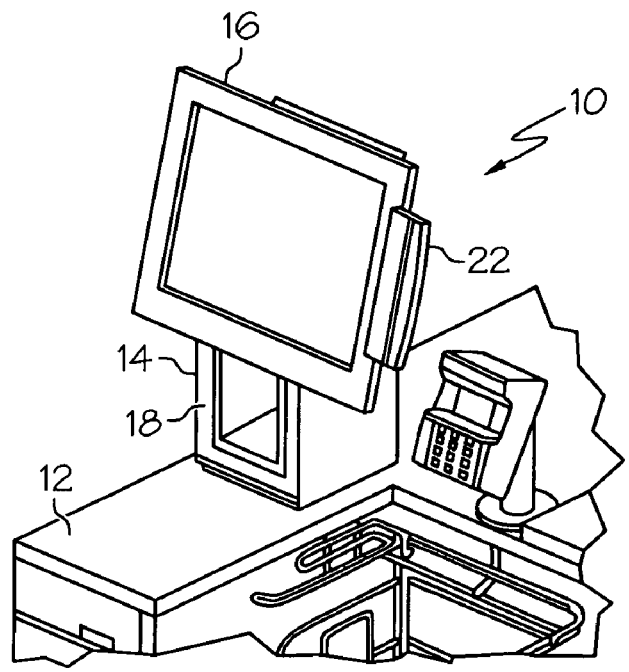
FIGS. 2A and 2B are perspective views of a stand of the convertible self-checkout system respectively in a first angular position and a second angular position relative to the base of the convertible self-checkout system.
Figure 2B:
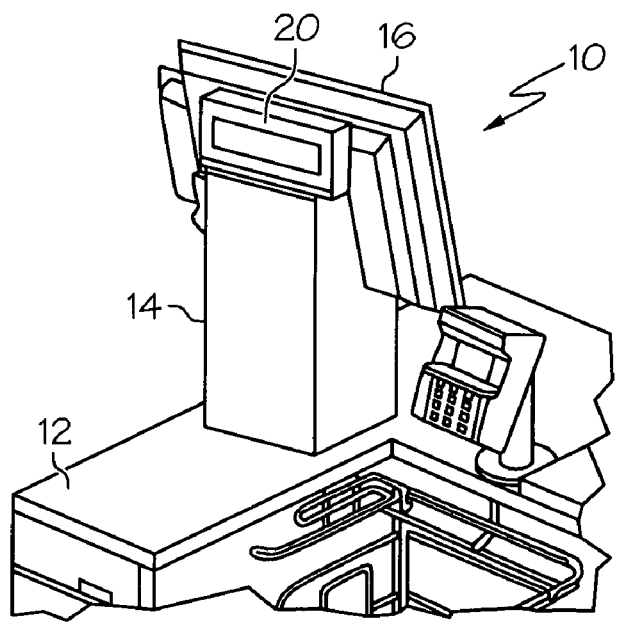

FIGS. 1A, 1B and 2A, 2B illustrate a convertible self-checkout system 10 for scanning products. The self-checkout system 10 includes a base 12 and a stand 14 rotatably mounted to the base 12. The stand 14 includes an input/output device 16 facing in a first direction and a product scanner 18, and the stand 14 is positionable relative to the base 12 in at least a first angular position (e.g., FIG. 2A) and a second angular position (e.g., FIG. 2B). Although not limited in this manner, the first angular position of the stand 14 relative to the base 12 may be substantially 180° apart from the second angular position.

Many types of input/output devices 16 are known to be capable of being used use in self-checkout systems, and the present self-checkout system 10 is not limited as to a particular type of input/output device 16. For example, the input/output device 16 may be separate devices, such as a keypad and a video display, or the input/output device 16 may be combined into a single unit, such as an interactive video touchpad display.

The input/output device 16 may have a first mode corresponding to the first angular position and a second mode corresponding to the second angular position. For example, if the self-checkout system 10 is operating in a shelf-checkout mode (i.e., the first mode), then the input/output device 16 may operate differently than if the self-checkout system 10 is operating in a staffed mode (i.e., the second mode) because, for example, a shopper may be required to input different information into the input/output device 16 than would a cashier. Additionally, a cashier may require access to additional options from the input/output device 16 that would not be required for a shopper.

A sensor 26 (shown in FIG. 3) may be included to determine the angular position of the stand 14 relative to the base 12, and this information may be communicated to the input/output device 16 to determine the particular mode of operation for the input/output device 16. Many types of positional detection devices are known, and the self-checkout system 10 is not limited as to a particular sensor 26 so capable. Although not limited in this manner, the sensor 26 may be operationally connected to the latch 34 so that the input/output device 16 is not placed into a particular operational mode until the latch 34 has been engaged to prevent movement of the stand 14 relative to the base 12.

The self-checkout system 10 includes a scanner 18 for detecting a product placed within the range of the scanner 18. Many types of scanning devices are known to be capable of detecting a product, and the self-checkout system 10 is not limited as to particular type of scanner 18 so capable. For example, the scanner 18 may be a radio frequency identification (RFID) reader. However, in current aspects of the self-checkout system 10, the scanner 18 is a barcode reader. Although not limited in this manner, the scanner 18 may be positioned to face in substantially the same direction as the input/output device 16.

The self-checkout system 10 may also include a video display 20 facing in a direction that is substantially opposite from the direction the input/output devices 16 faces. In this manner, if the self-checkout system 10 is operating in a staffed mode (i.e., the second mode), the video display 20 may display information to the shopper such as the item being scanned and/or the price of the item being scanned. If the self-checkout system 10 is operating in a shelf-checkout mode (i.e., the first mode), the video display 20 may display similar information to a cashier monitoring the transaction.

In addition to or alternatively, while in the shelf-checkout mode, the video display 20 may display information that could be useful to a cashier monitoring the transaction. For example, the display information may include an error message and/or a transaction status, such as "available to scan," "scanning," or "waiting payment." If different types of information are displayed depending upon whether the self-checkout system 10 is in the first mode or the second mode, the type of information being displayed may be triggered by a reading from the sensor 26 as to the angular position of the stand 14 relative to the base 12.

A payment reader 22 may also be included on the mount 14, and the self-checkout system 10 is not limited as to a particular type of payment reader 22. In a current aspect of the checkout system 10, however, the payment reader 22 is a magnetic stripe reader.

Figure 3:
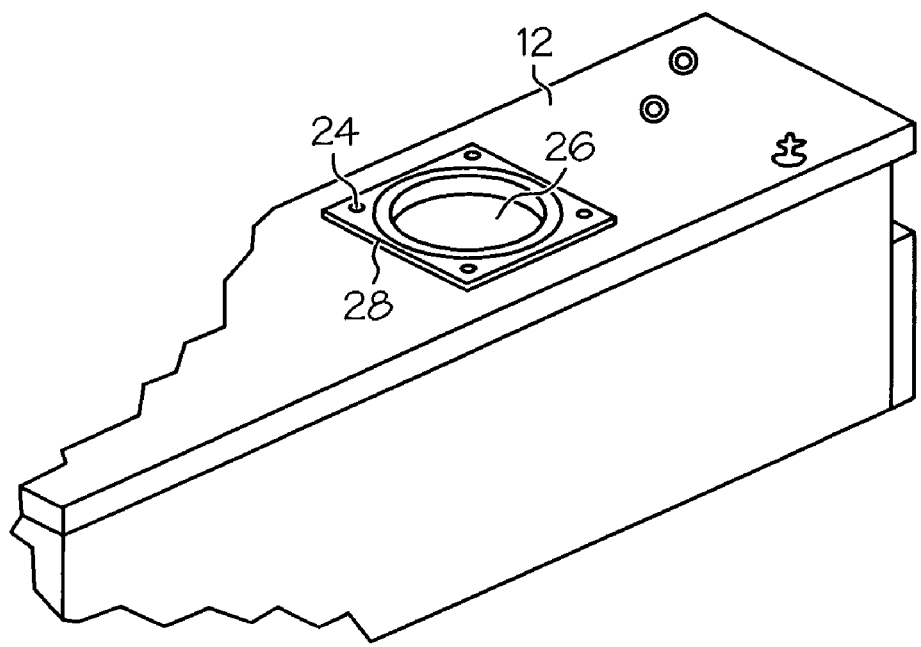
FIG. 3 is a perspective view of a turntable upon which the stand is positioned.

Referring to FIG. 3, a turntable 24 may be provided to which the base 12 and the stand 14 are attached. Although not limited in this manner, the turntable 24 may include a substantially semi-circular slot 28 through which cables may be run.

Figure 4:
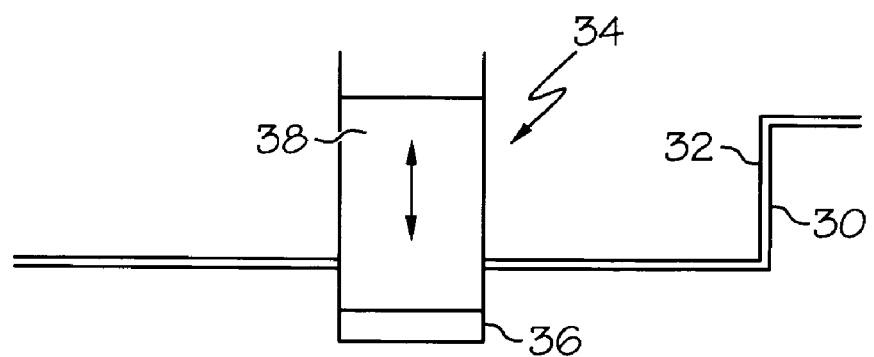
FIG. 4 is a partial side view of a latch and stop for the convertible self-checkout system.

Referring to FIG. 4, the self-checkout system 100 may include one or more stops 30 to prevent the stand 14 from rotating relative to the base 12 substantially past the first and/or second angular positions. Many different types of devices are capable of stopping one feature from rotating relative to another feature past a certain angular position, and the self-checkout system 100 is not limited as to a particular stop 30 so capable.

For example, one of the base 12 and stand 14 may include a projection 30 extending from the base 12 or stand 14, and the other of the base 12 and stand 14 may also include a projection 32 extending from the base 12 or stand 14. These projections 30, 32 are positioned so that the projections 30, 32 do not interfere with one another as the base 12 rotates relative to the stand 14 until a point at which rotation of the stand 14 relative to the base 12 is desired to be stopped, for example, at either of the first and second angular positions of the stand 14 relative to the base 12.

One or more latches 34 may also be included to optionally prevent rotation of the stand 14 relative to the base 12 upon the stand 14 being in the first or second angular positions. In this manner, while the latch 34 is engaged, the stand 14 remains in the same angular position relative to the base 12. However, while the latch 34 is disengaged, the stand 14 is allowed to rotate relative to the base 12. Many different types of devices are capable of optionally preventing one feature from rotating relative to another, and the self-checkout system 100 is not limited as to a particular latch 34 so capable.

For example, one of the base 12 and stand 14 may include a movable pin 38 in the base 12 or stand 14, and the other of the base 12 and stand 14 may also include a detent 36 within the base 12 or stand 14. When the base 12 and stand 14 are positioned relative to one another such that the pin 38 can be positioned within the detent 36, the pin 38 prevents the base 12 and the stand 14 from rotating relative to one another. However, if the pin 38 is removed from the detent 36, the stand 14 may be free to rotate relative to the base 12.

Although not limited in this manner, the self-checkout system 10 may include any combination of the following features. A transaction awareness light 40 may be provided to indicate the stage or condition of a transaction being processed. A payment light 42 may be provided to indicate the type of checkout system (i.e., self-checkout or staffed checkout). A payment device 44, such as a magnetic strip reader and pin pad, may be provide to process electronic payments. A coupon detector and signature capture reader 48 may also be provided.

Optionally included with the self-checkout system 10 is a bagging station on the shopper side of the base 12 that may include a bagging rack 52, a scale platter 54, and a load cell 56. The self-checkout system 10 may also include a system reset button 58, an access panel 60, and a storage cabinet 62. A proximity sensor 64 may be provided to indicate to the self-checkout system 10 that a shopper is positioned in front of the base 12. An audio speaker 66 may also be provided for providing audio instructions to the shopper for operating the self-checkout system 10.

On the cashier-side of the self-checkout system 10 a cash drawer 68 may be provided as well as a bag hook 70. A coupon box 76 may also be provided for receiving coupons, and an access panel 74 may be provided to allow access within the base 12.

The computer system 72 may be provided to control the operation of the self-checkout system 10. For example, the computer system 72 may process information from the scanner 18, the signature capture reader 48, load cell 56, payment device 44, magnetic strip reader 22, system reset button 58, proximity sensor 64, and input/output device 16. The computer system 72 may also operate the transaction awareness light 40, scanner 18, input/output device 16, video display 20, payment device 44, and the magnetic stripe reader 22. The self-checkout system 10 is not limited to a particular type of computer system 72 or where the computer 72 system is located. For example, the computer system 72 or portions thereof may be located remote from the base 10 and stand 12 and/or portions of the computer system 15 may be included within the base 10 and/or stand 12.

What is claimed is:

1. A convertible self-checkout system, comprising:
a base; and
a stand rotatably mounted to the base, wherein
the stand includes an input/output device facing in a first direction and a product scanner, and
the stand is positionable relative to the base in at least a first angular position and a second angular position, wherein
the input/output device is angularly fixed relative to the product scanner,
the self-checkout system having a self-checkout mode corresponding to the first angular position and a staffed mode corresponding to the second angular position,
the input/output device facing a first direction in the self-checkout mode and facing in a second direction, different than the first direction, in the staffed mode,
the base includes a substantially horizontal portion, and in the self-checkout mode, the scanner facing the substantially horizontal portion of the base, and
a rotational axis of the stand about the base is stationary relative to the base.

2. The self-checkout system according to claim 1, wherein the input/output device includes an interactive video display.

3. The self-checkout system according to claim 2, wherein the interactive video display having a first mode corresponding to the first angular position and a second mode corresponding to the second angular position.

4. The self-checkout system according to claim 3, further comprising a sensor for determining an angular position of the stand relative to the base and communicating the angular position to the interactive video display.

5. The self-checkout system according to claim 1, wherein the stand further comprises a video display facing in a second direction substantially opposite from the first direction.

6. The self-checkout system according to claim 1, wherein the scanner is a barcode reader.

7. The self-checkout system according to claim 1, wherein the scanner is a radio frequency identification reader.

8. The self-checkout system according to claim 1, further comprising a turntable to which the base and stand are attached.

9. The self-checkout system according to claim 1, further comprising a first stop for preventing the stand from rotating relative to the base substantially past the first angular position.

10. The self-checkout system according to claim 9, further comprising a second stop for preventing the stand from rotating relative to the base substantially past the second angular position.

11. The self checkout system according to claim 1, further comprising a first latch for optionally preventing rotation of the stand relative to the base upon the stand being in the first angular position.

12. The self checkout system according to claim 11, further comprising a second latch for optionally preventing rotation of the stand relative to the base upon the stand being in the second angular position.

13. The self checkout system according to claim 1, further comprising a payment reader attached to the stand.

14. A convertible self-checkout system, comprising:
a fixedly-positioned base; and
a stand rotatably and directly mounted to the base, wherein
the stand includes an input/output device facing in a first direction and a product scanner, and
the stand is positionable relative to the base in at least a first angular position and a second angular position, wherein
the input/output device is angularly fixed relative to the product scanner, and
the base includes a substantially horizontal portion, and in the self checkout mode, the scanner facing the substantially horizontal portion of the base.

15. A convertible self checkout system, comprising:
a fixedly-positioned base; and
a stand rotatably and directly mounted to the base, wherein
the stand includes an input/output device facing in a first direction and a product scanner, and
the stand is positionable relative to the base in at least a first angular position and a second angular position, wherein
the input/output device is angularly fixed relative to the stand, and
the base includes a substantially horizontal portion, and in the self checkout mode, the scanner facing the substantially horizontal portion of the base.

16. The self-checkout system according to claim 1, wherein in the staffed mode, the scanner facing away from the substantially horizontal portion of the base.

17. The self-checkout system according to claim 14, wherein in the staffed mode, the scanner facing away from the substantially horizontal portion of the base.

18. The self-checkout system according to claim 15, wherein in the staffed mode, the scanner facing away from the substantially horizontal portion of the base.

* * * * *